(No Model.)
B. J. NOYES.
SIGNALING APPARATUS.
No. 551,090. Patented Dec. 10, 1895.
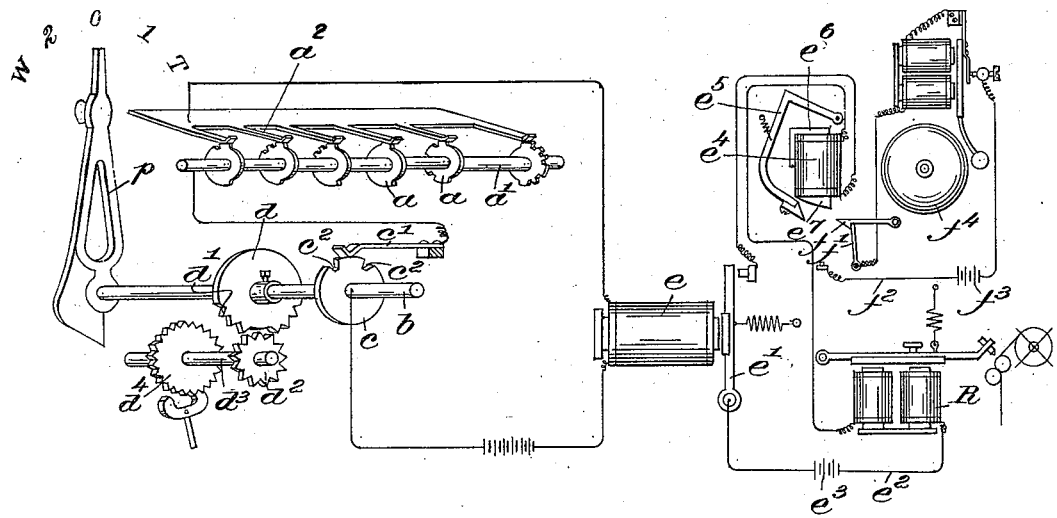
Witnesses.
Fred S. Greenleaf.
Thomas J. Drummond.
Inventor:
Bernice J. Noyes.
By Crosby & Gregory
attys.

UNITED STATES PATENT OFFICE.

BERNICE J. NOYES, OF BOSTON, MASSACHUSETTS, ASSIGNOR TO GEORGE W. GREGORY, OF SAME PLACE.

SIGNALING APPARATUS.

SPECIFICATION forming part of Letters Patent No. 551,090, dated December 10, 1895.

Application filed September 11, 1889. Serial No. 323,645. (No model.)

*To all whom it may concern:*

Be it known that I, BERNICE J. NOYES, of Boston, county of Suffolk, State of Massachusetts, have invented an Improvement in Signaling Apparatus, of which the following description, in connection with the accompanying drawing, is a specification, like letters on the drawing representing like parts.

In United States Patent No. 359,687, dated March 22, 1887, a signaling apparatus is shown comprising several signal-transmitters at sub-stations and a signal-receiving apparatus at the central station connected by an electric circuit. The signal-transmitters are constructed and arranged to transmit two classes of signals, as patrol or post signals and special signals. The receiving apparatus at the central station comprises a register and an audible signaling-instrument, preferably a bell, and the arrangement of parts is such that the bell responds with some signals, as the special signals, and not with other signals, as the patrol or post signals. The results are therein shown as carried out by means of a transmitter, or what may be more technically termed an "automatic switch or circuit-changer."

This invention has for its object to construct and arrange a signaling apparatus by which the results above set forth may be carried out, the specific means employed being novel.

In order to cause the bell to respond on the reception of a special signal only, I herein employ impulses of longer duration than the impulses employed for transmitting the signal.

The signal-transmitter employed must be constructed and arranged to send different signals, and hence a pointer or equivalent is used to place the parts of the transmitter in proper relative position for the different signals.

In this invention I have arranged the parts so that the distinguishing impulse which is the impulse of long duration that is employed to cause the bell to respond shall be transmitted by the pointer or equivalent while moving into one or another position for a special signal, thereby presenting a manual switch, yet one which is operated every time when turned to a special signal without calling into operation the natural faculties of the person sending the signal.

The figure shows in diagram a signaling apparatus embodying this invention, representing a signal-receiving apparatus at the central station and and one signal-transmitter connected in the circuit at a sub-station.

Referring to the drawing, the signal-transmitter represented comprises a series of circuit-wheels $a$, arranged on a shaft $a'$, and a series of pens $a^2$ for the wheels.

A selecting-cylinder (not shown) is employed to move one or another pen into contact with one or another wheel—such, for instance, as shown in United States Patent No. 320,032, dated June 16, 1885—said selecting-cylinder being arranged on the shaft $b$, to which the pointer is attached; yet so far as this invention is concerned the transmitter thus far described may be varied materially, the only essential requirement being that the pointer or equivalent device be employed to set the co-operating parts of the transmitter in position to transmit different signals or to select the signal.

A circuit-wheel $c$ is secured to the shaft $b$, and a pen $c'$ bears on said circuit-wheel. The circuit-wheel $c$, as shown, has two notches or insulated portions $c^2$, and the pen $c'$ bears on the wheel between these notches when the pointer is in vertical position. The notches $c^2$ are arranged sufficiently far apart to permit the pointer to be moved for the post or patrol signals without effecting the circuit at $c^2$; but when the pointer is moved to the extreme right or left for a special signal—as wagon or telephone, for instance—the pen $c'$ will pass over one or the other notch $c^2$, and, as shown in the drawing, will open the line. A retarding device is provided for the pointer $p$, designed to be brought into operative connection therewith while the pen $c'$ is passing over the notches $c^2$, but at no other time. This retarding device, as shown, consists of a wheel $d$, having two series of teeth, as $d'$, on its periphery, a toothed wheel $d^2$, which is engaged by the wheel $d$ when the latter is turned in one or the other direction, said toothed wheel $d^2$ being secured to a shaft $d^3$, upon which is arranged the escape-wheel $d^4$.

By the retarding device arranged to be brought into operative connection, as shown, the impulses transmitted by moving the pointer $p$ onto the special signal will be of long duration. As it is desired to move the pointer $p$ only in a limited arc, less than one-half of the wheel $d$ will be used—that is, only its toothed portion.

The armature $e'$ is included in a local circuit $e^2$, containing a battery $e^3$ and an electromagnet for the register R, so that as the armature responds the register operates. The local circuit $e^2$ also contains an electromagnet $e^4$, the armature $e^5$ of which is bent so that one part of it moves in the field of the pole $e^6$ and another part moves in the field of the pole $e^7$. This armature $e^5$ is normally held retracted by the spring.

The end of the armature $e^5$ is formed to raise a latch $f$ and let fall a drop $f'$, which is arranged to close a local circuit $f^2$, containing a local battery $f^3$ and bell $f^4$. As the armature $e^5$ has a long movement it cannot respond as readily as the armature $e'$, and hence for impulses of short duration it will not move sufficiently to lift the latch $f^\times$; but upon the occurrence of an impulse of long duration it will raise the latch $f$, and hence the bell will respond.

To make the distinction more effective, the retractile springs of the armature may vary in tension.

It will be seen that by the arrangement thus described a bell will respond to such signals as desired, being controlled entirely by means of the pointer or setting device for the multiple transmitter; yet other forms of receiving apparatus may be employed responsive to an impulse of long duration produced by the pointer or equivalent signal-setting device which will come within the spirit and scope of my invention.

I claim—

1. A signal receiving apparatus and several signal transmitters and an electric circuit connecting them, said signal receiving apparatus comprising a register and an indicating signal, the latter being caused to act only by an impulse of longer duration than that employed to operate the former, combined with a pointer or equivalent setting device for the signal transmitter, and a circuit changer moved by it, and a retarding device governing the movement of said pointer, substantially as described.

2. A signal-receiving apparatus containing a register and a special indicating signal; an electric circuit; a receiving magnet therein controlling said register; a transmitter also in said circuit, and adapted to operate to cause responsive action of the said receiving magnet and its receiver; a special magnet in said circuit, for and to control said special indicating signal, the same being responsive only to prolonged changes in the condition of said circuit; and a transmitter selecting device, and means operated thereby to effect a prolonged change in the condition of said circuit to operate said special magnet and its special indicating signal independent of the operation of said transmitter, substantially as described.

3. A multiple signal transmitter, a pointer, and switch moved by the pointer, and a retarding device which is operatively connected therewith in certain positions only, combined with a signal receiving apparatus connected with the multiple signal transmitter by an electric circuit, said signal receiving apparatus comprising a register and a bell, substantially as described.

In testimony whereof I have signed my name to this specification in the presence of two subscribing witnesses.

BERNICE J. NOYES.

Witnesses:
GEO. W. GREGORY,
E. J. BENNETT.